Dec. 30, 1924.
C. F. JENKINS
1,521,189
FILM RECEPTION OF BROADCASTED PICTURES
Filed Aug. 30, 1922
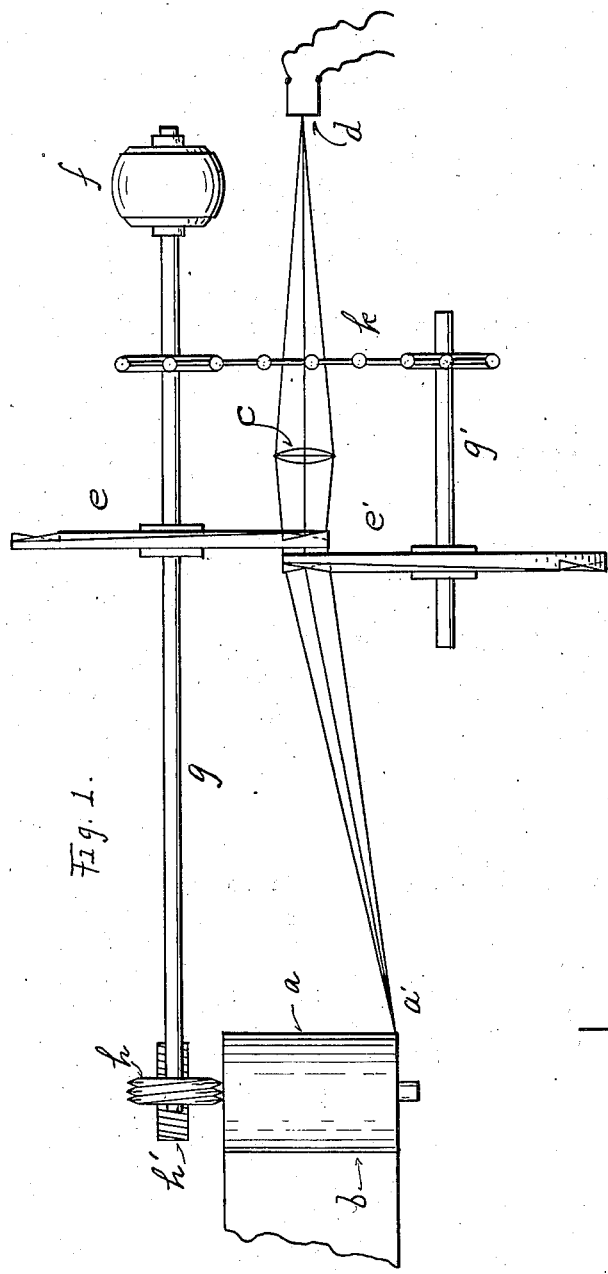
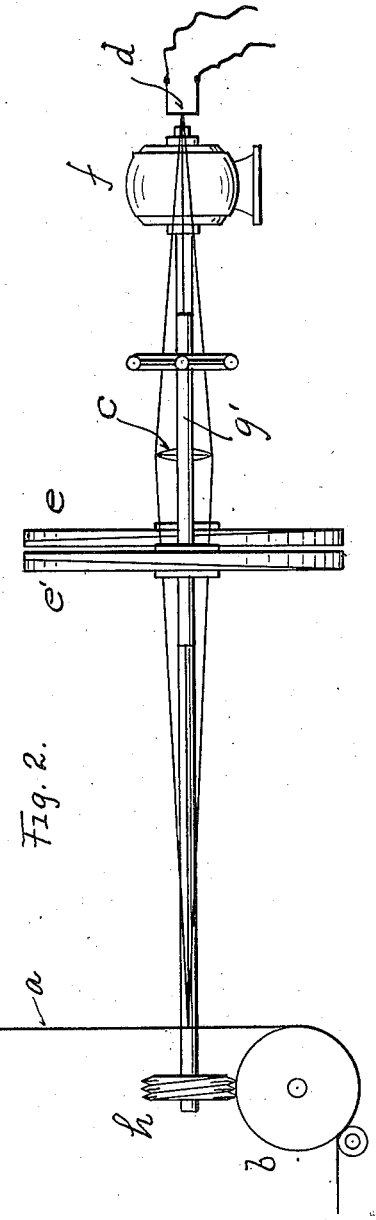
Inventor
C. Francis Jenkins Patented Dec. 30, 1924.

1,521,189

UNITED STATES PATENT OFFICE.

CHARLES FRANCIS JENKINS, OF WASHINGTON, DISTRICT OF COLUMBIA, ASSIGNOR TO RADIO PICTURES CORPORATION, OF WASHINGTON, DISTRICT OF COLUMBIA, A CORPORATION.

FILM RECEPTION OF BROADCASTED PICTURES.

Application filed August 30, 1922. Serial No. 585,319.

*To all whom it may concern:*

Be it known that I, CHARLES FRANCIS JENKINS, a citizen of the United States, residing at Washington, District of Columbia, have invented certain new and useful Improvements in Film Reception of Broadcasted Pictures, of which the following is a specification.

This invention relates to apparatus for the broadcasting of photographs and motion-pictures-by-radio, and has for its object apparatus which will permit covering the whole area of each discrete picture sent and received, while maintaining the quality of the picture obtained by the use of two ring pisms, disclosed in application Serial No. 442,873.

In the diagrammatic drawings herein, Fig. 1 is a top view, Fig. 2 the side elevation of the apparatus, in which $a$ is a picture film having transparencies thereon, $b$ a sprocket for advancing the film at a uniform rate, $c$ a lens for imaging the pictures onto the light sensitive cell $d$; $e$ and $e'$ are prismatic rings, the subject of Patent No. 1,385,255. $f$ is a motor for rotating these prismatic rings, the same being a direct couple to shaft $g$, with a worm $h$ mounted thereon, engaging a gear $h'$ mounted on the shaft of the sprocket $b$. The shaft $g'$ upon which the other prism is mounted is given suitable rotation by means of the beaded belt $k$.

The operation of the device is as follows:—The picture transparency, illuminated from the back, by daylight, for example, is swept across by a thin pencil of light indicated by line $a'$—$d$, which if traced from $d$ to $a'$ is observed to pass through lens $c$, prismatic rings $e$ and $e'$, which latter in the positions shown in the drawing deflects the pencil of light to the position $a'$ on the picture surface. The form and rotation of the prismatic rings is such that the point $a'$ is swept across the picture surface $a$ once for each rotation of the prismatic rings $e'$ and $e$ (if these are assumed to be single-prism rings or discs). Each rotation of the prismatic rings, therefore, causes the pencil of light to cross the picture surface. But as the film has, meantime, moved downward a given amount, for example, 1/200 part, it is obvious that the second crossing of the point of the pencil of light will lie above the previous line, which line will, therefore, because of the downward movement of the film, lie adjacent to the previous line, and thus the whole of the picture surface will be covered in a succession of parallel lines.

As all points of the picture thus covered pass out through the lens $c$ and fall in a common spot on the sensitive cell $d$, it is obvious that the various light values which make up the picture surface will cause corresponding changes in the conductivity of the light sensitive cell $d$, and the electrical circuit of which it is a part.

The application of this fluctuating electrical current to the radio sending or receiving set is not a part of this application, and, therefore, is not illustrated or described herein.

What I claim is—

1. In radio-pictures apparatus, the combination of a constantly moving picture, a light sensitive cell located in front thereof, and a constantly-changing angle prism between them for causing one end of a pencil of light to sweep laterally across the picture surface, the other end of the pencil of light constantly falling on the light sensitive cell.

2. In radio-pictures apparatus, the combination of a constantly moving picture, a light sensitive cell located in front thereof, a pair of overlapping rotating prismatic rings lying between said picture and said light sensitive cell and means for causing a predetermined rate of rotation between said rings.

3. In radio picture apparatus, the combination of a constantly moving picture surface, a light sensitive cell located in front thereof, and a pair of overlapping rotating prismatic rings lying between said picture surface and said light sensitive cell, the prisms so located that the plane of the diameter of one prism ring lies in the extension of the plane of the diameter of the other prism ring.

4. In radio picture apparatus, the combination of a constantly moving light receiving surface, a source of picture light, and a rotating prismatic ring so located with respect to the said constantly moving surface that the whole surface is covered with the picture light in successive parallel lines.

In testimony whereof I have affixed my signature.

CHARLES FRANCIS JENKINS.